US011379367B2

United States Patent
Colella et al.

(10) Patent No.: US 11,379,367 B2
(45) Date of Patent: Jul. 5, 2022

(54) ENHANCEMENT FOR ACTIVATION AND DEACTIVATION OF MEMORY ADDRESS REGIONS

(71) Applicant: Micron Technology, Inc., Boise, ID (US)

(72) Inventors: Nicola Colella, Capodrise (IT); Antonino Pollio, Vico Equense (IT); Hua Tan, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 47 days.

(21) Appl. No.: 16/952,813

(22) Filed: Nov. 19, 2020

(65) Prior Publication Data

US 2022/0156185 A1    May 19, 2022

(51) Int. Cl.
*G06F 12/00* (2006.01)
*G06F 12/0802* (2016.01)
*G06F 12/02* (2006.01)

(52) U.S. Cl.
CPC ...... *G06F 12/0802* (2013.01); *G06F 12/0223* (2013.01); *G06F 2212/604* (2013.01); *G06F 2212/608* (2013.01)

(58) Field of Classification Search
CPC ............ G06F 12/0802; G06F 12/0223; G06F 2212/604; G06F 2212/608
See application file for complete search history.

(56) References Cited

U.S. PATENT DOCUMENTS

| | | | | |
|---|---|---|---|---|
| 2013/0191601 | A1* | 7/2013 | Peterson | G06F 12/0868 711/E12.017 |
| 2013/0282955 | A1* | 10/2013 | Parker | G06F 12/0246 711/E12.008 |
| 2018/0039573 | A1* | 2/2018 | Shung | G11C 29/52 |
| 2020/0089617 | A1* | 3/2020 | Onishi | G06F 12/1009 |
| 2020/0341909 | A1* | 10/2020 | Vanninen | G06F 12/123 |
| 2021/0034531 | A1* | 2/2021 | Wallach | G06F 13/1684 |
| 2021/0056023 | A1* | 2/2021 | Jin | G06F 12/0246 |
| 2021/0232343 | A1* | 7/2021 | Kim | G06F 3/0604 |
| 2021/0318957 | A1* | 10/2021 | Jeong | G06F 3/0688 |
| 2021/0334217 | A1* | 10/2021 | Sharma | G06F 12/0866 |

* cited by examiner

*Primary Examiner* — Shawn X Gu
*Assistant Examiner* — Mohammad S Hasan
(74) *Attorney, Agent, or Firm* — Holland & Hart LLP

(57) ABSTRACT

Methods, systems, and devices for read operations for regions of a memory device are described. In some examples, a memory device may include a first cache for storing mappings between logical addresses and physical addresses of the memory device, and a second cache for storing indices associated with entries removed from the first cache. The memory device may include a controller configured to load mappings to the first cache upon receiving read commands. When the first cache is full, and when the memory device receives a read command, the controller may remove an entry from the first cache and may store an index associated with the removed entry to the second cache. The controller may then transmit a mapping associated with the index to a host device for use in a HPB operation.

25 Claims, 5 Drawing Sheets

ENHANCEMENT FOR ACTIVATION AND DEACTIVATION OF MEMORY ADDRESS REGIONS

FIELD OF TECHNOLOGY

The following relates generally to one or more systems for memory and more specifically to read operations for regions of a memory device.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
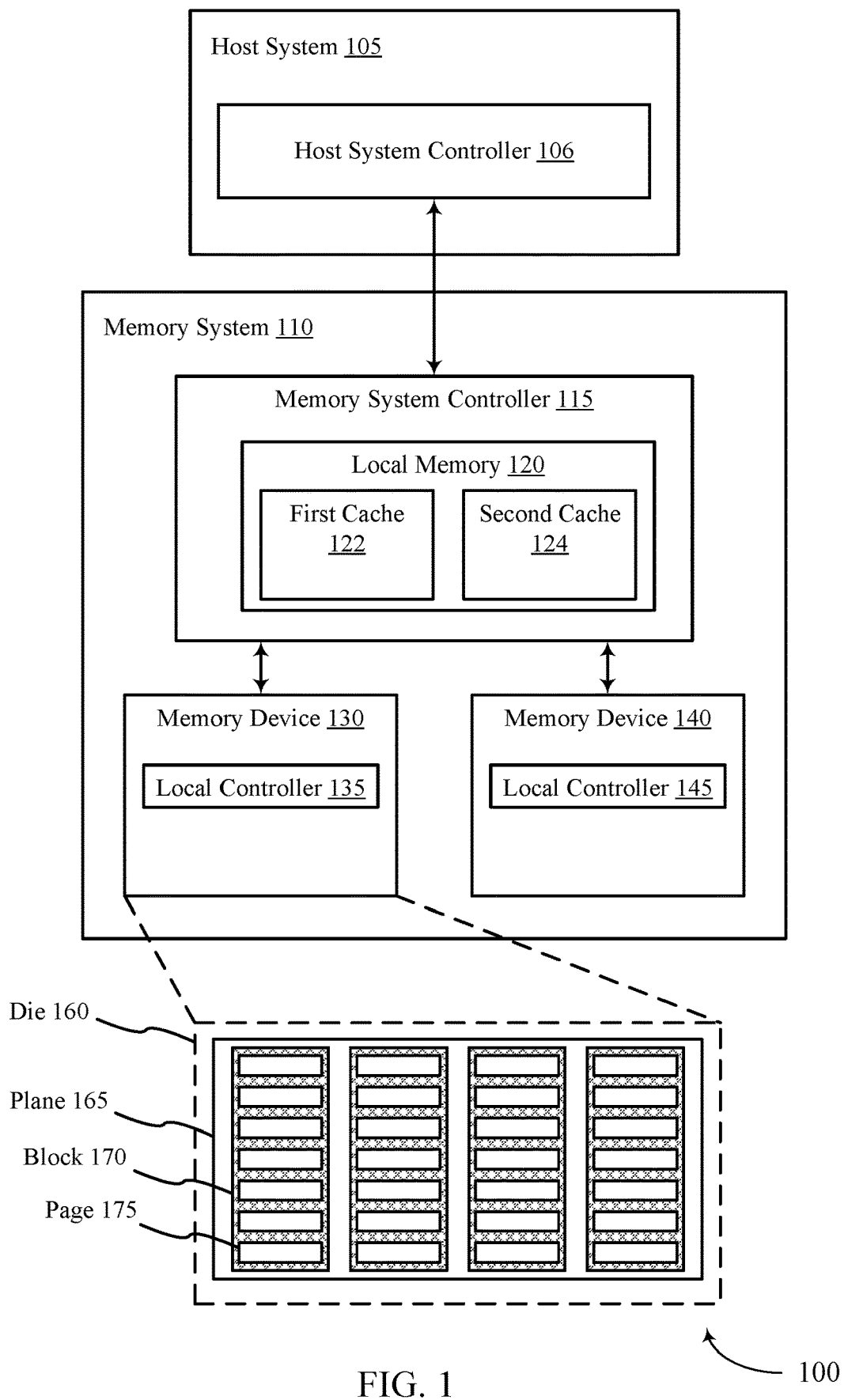
FIGS. 1 and 2 illustrate examples of systems that support read operations for regions of a memory device in accordance with examples as disclosed herein.

High capacity storage systems may perform address translation between logical addressing and physical addressing. A managed NAND (mNAND) device may maintain a table (e.g., a logical-to-physical (L2P) table) in the NAND memory that has a complete mapping between all logical addresses and physical addresses. Reading each L2P table entry at the time of receiving a command (e.g., read, write) may increase latency due to the time to read the L2P table entry. Accordingly, some mNAND devices may have an L2P buffer that includes other, faster types of memory (e.g., SRAM, DRAM) to store portions of the L2P table. However, the L2P buffer may have limited space and thus may be unable to store the entire L2P table.

Some memory systems include a capability of performing a host performance booster (HPB) operation that may be activated (e.g., activated per region) when a quantity of reads satisfies a threshold value. A HPB operation may include sending portions of the L2P table (e.g., corresponding to regions satisfying the threshold value) to a host system and allowing the host system to use the physical addresses for commands, which reduces latency by skipping the address translation in the system. However, HPB operations may incur additional latency due to sending the L2P table for the activated regions from the mNAND device to the host. Accordingly, a system for managing the mNAND L2P buffer and HPB operations to reduce latency and increase performance may be desirable.

A system for managing a mNAND L2P buffer and HPB operations to reduce latency and increase performance is described herein. In some instances, the L2P buffer of a memory system may be divided (e.g., split) into a first cache that stores a quantity of blocks of the L2P table and a second cache that stores information related to blocks activated for HPB operation. The first cache may be updated after each read operation in a return-to-head manner, where an accessed region (e.g., an accessed block of the L2P table) is returned to the head of the first cache.

When the first cache is full and a new access operation is performed on a region not already in the table, the tail entry of the first cache may be transitioned to HPB operation. In such instances, the portion of the L2P table corresponding to the tail entry may be provided to the host. The second cache may include a bit map indicating regions that are activated for HPB operation, which may be updated when L2P regions are sent to the host. The second cache may include a table of regions (e.g., region indices) activated for HPB operations. Accordingly, when a read operation is performed on a region activated for a HPB operation (e.g., as indicated by an index of the second cache), the HPB operation may be performed using the L2P table stored by the host. By performing read operations as described herein, latency associated with HPB operations may be reduced by loading some L2P tables directly from the first cache. Additionally or alternatively, performance characteristics of the first cache may allow for improved read speeds in non-HPB operations.

Features of the disclosure are initially described in the context of a system as described with reference to FIGS. 1 and 2. Features of the disclosure are described in the context of a process flow diagram as described with reference to FIG. 3. These and other features of the disclosure are further illustrated by and described with reference to an apparatus diagram and flowchart that relate to read operations for regions of a memory device as described with reference to FIGS. 4 and 5.

FIG. 1 is an example of a system 100 that supports read operations for regions of a memory device in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120 and 120-*a*. In some cases, the local memory 120 and 120-*a* may include read-only memory (ROM) or other memory that may store operating code (e.g., executable instructions) executable by the memory system controller 115 to perform functions ascribed herein to the memory system controller 115. In some cases, the local memory 120 and 120-a may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 and 120-a may serve as a cache for the memory system controller 115. For example, data may be stored to the local memory 120 and 120-a when read from or written to a memory device 130 or memory device 140, and may be available within the local memory 120 and 120-a for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support read operations for regions of a memory device. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform one or more associated functions as described herein.

In some examples, the memory system controller 115 may include local memory 120, which may be configured to include a first cache 122 and a second cache 124. The local memory 120 may be configured to store entries corresponding to portions of a L2P table (e.g., quantities of blocks of the L2P table) loaded from the memory device 130 or the memory device 140. For example, when the host system 105 communicates a read command to the memory system 110, the memory system controller 115 may load a portion of an L2P table (from the memory device 130 or the memory device 140) to the first cache 122. The memory system controller 115 may load the portion of the L2P table based on a LBA included in the read command. The memory system controller 115 may continue loading portions of the L2P table, upon receiving read commands, until the first cache 122 of local memory 120 is full.

When the first cache 122 is full, and when the memory system controller 115 receives a read command (e.g., a read command that includes a LBA not corresponding to an entry stored to the first cache 122), the memory system controller 115 may remove an entry from the first cache 122. The first cache 122 may store entries in a return-to-head manner, such that the first entry (e.g., the top entry) corresponds to the most-recently accessed portion of the memory device 130 or the memory device 140 and the last entry (e.g., the bottom entry) corresponds to the least-recently accessed portion of the memory device 130 or the memory device 140. In some examples, the memory system controller 115 may remove the last entry from the first cache 122.

Upon removing an entry from the first cache 122, the memory system controller 115 may store an index associated with the removed entry to the second cache 124. The second cache 124 may include one or more indices associated with entries removed from the first cache 122 and which identify regions of the memory device 130 or the memory device 140. In addition to storing an index to the second cache 124, the memory system controller 115 may transmit the portion of the L2P table (the portion of the L2P table removed from the first cache 122) to the host system 105. Accordingly, in subsequent read operations, the host system 105 may perform an HPB operation using the physical address of the memory device 130 or the memory device 140 included in the L2P table.

By performing read operations as described herein, latency associated with HPB operations may be reduced by loading some L2P tables directly from the first cache 122. Moreover, by organizing entries of the local memory 120 according to a frequency of read operations performed on the associated region, the local memory 120 may avoid tracking read counts for each region, thus reducing the quantity of storage needed for tracking operations.

Figure 2:
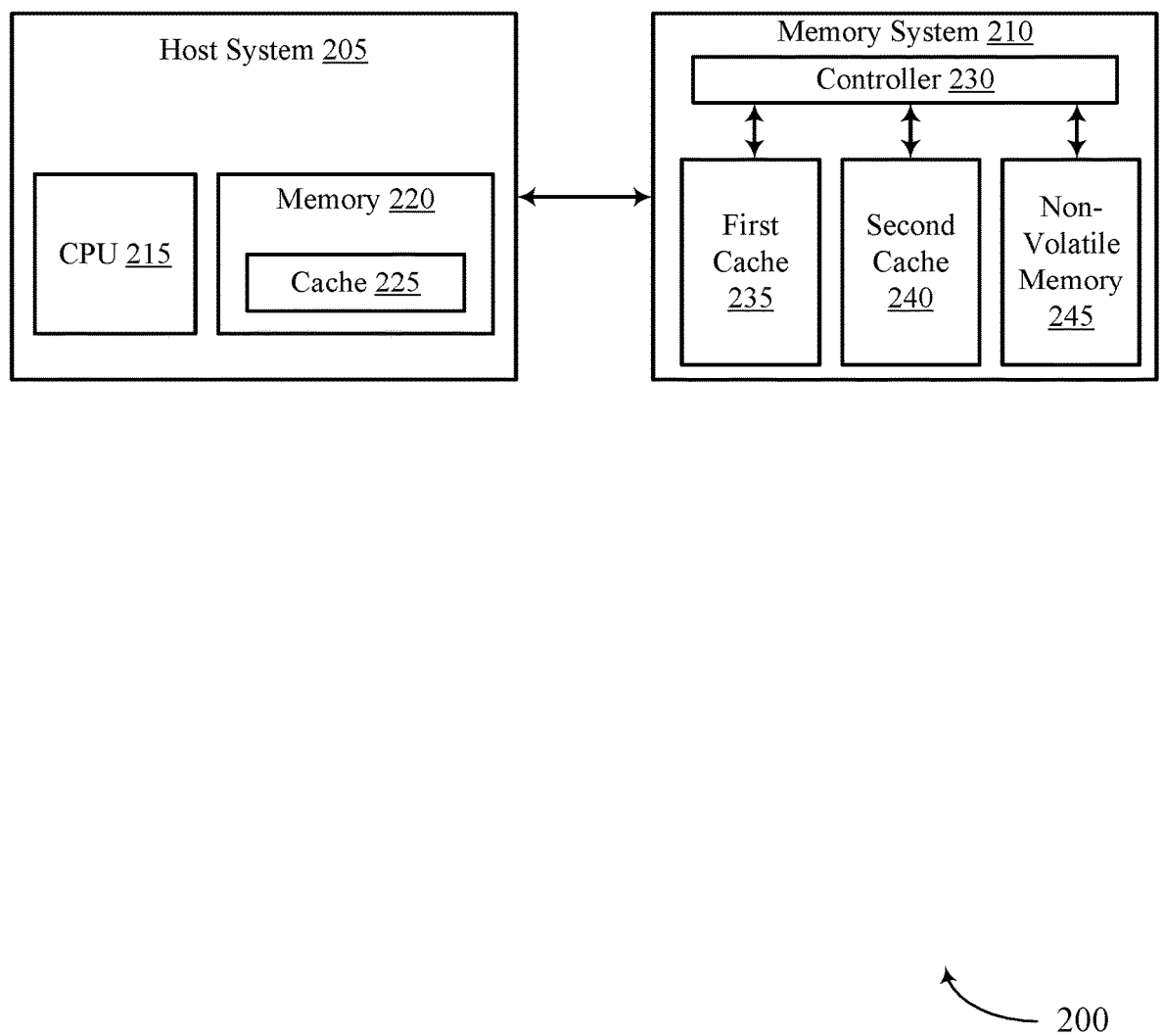

FIG. 2 illustrates an example of a system 200 that supports read operations for regions of a memory device in accordance with examples as disclosed herein. The system 200 may include a host system 205 and a memory system 210. In some examples, the host system 205 may be an example of the host system 105 and the memory system 210 may be an example of the memory system 110 as described with reference to FIG. 1. The host system 205 may include a cache 225 (e.g., a portion of the memory 220 of the host system 205 that is configured as cache storage) for storing L2P tables. In some examples, the cache 225 may store L2P tables that may be used in a HPB operation. Additionally or alternatively, the memory system 210 may include a cache 235 (e.g., a first cache 235) for storing L2P tables and a cache 240 (e.g., a second cache 240) for storing indices that identify active regions of the non-volatile memory 245. The cache 225 may store portions of an L2P table associated with regions of the non-volatile memory 245 activated for HPB operation and may use the mappings (e.g., the portions of the L2P table) in a HPB operation. Accordingly, read operations may be performed on the non-volatile memory 245 with reduced latency due to portions of an L2P table being stored to the cache 225 (e.g., for HPB operations) or to the cache 235.

In some examples, the host system 205 may be configured to perform access operations (e.g., read operations, write operations) on the memory system 210. The memory system 210 may include non-volatile memory 245 that includes one or more memory cells (e.g., one or more non-volatile memory cells such as flash memory cells). For example, the non-volatile memory 245 may include a plurality of regions that include a quantity of blocks. Each block may include a respective set of pages, and each page may include a set of memory cells, such as a set of non-volatile memory cells (e.g., flash memory cells). In some examples, the non-volatile memory 245 may include an L2P table that includes mappings between logical addresses and physical addresses of the non-volatile memory 245. Portions of the L2P table may be loaded (e.g., loaded from the non-volatile memory) and stored to the cache 235 or transmitted to the host system 205 (e.g., for storing at the cache 225).

In some instances, the host system 205 may issue read commands to the memory system 210, which may or may not be associated with HPB operations. As described herein, an HPB operation is generally performed on active regions of the non-volatile memory 245. For example, an active region may correspond to a region of the non-volatile memory 245 having undergone a prior access operation and having an associated index stored to the second cache 240. When a read command is received by the memory system 210, the controller 230 may determine whether an LBA included in the read command is included in a portion of the L2P table stored as an entry in the first cache 235, or whether the read command corresponds to an active region of the non-volatile memory 245 (as indicated by an index stored to the second cache 240).

When an associated L2P table is stored to the first cache 235, the controller 230 may perform a read operation using the portion of the L2P table stored to the first cache 235 (e.g., using a mapping between the LBA and a physical address of the non-volatile memory 245 that is stored to the first cache 235). In other examples, the controller 230 may determine that a region associated with the LBA is active (e.g., as indicated by an index stored to the second cache 240) and a read operation may be performed using the physical address received by the memory system 210. That is, the host system 205 may use a portion of the L2P table stored to the host system 205 (e.g., using a mapping between the LBA and a physical address of the non-volatile memory 245 that is stored to the cache 225) to obtain the physical address, and may send the physical address to the memory system 210 in the read operation (e.g., HPB read operation). In some cases, the host system 205 may send the physical address in an HPB read operation, and the memory system 210 may determine (e.g., based on a bitmap of active regions) that the region associated with the LBA has become deactivated (e.g., is inactive) for HPB operation, in which case the memory system 210 may retrieve the valid physical address from the L2P table stored in the non-volatile memory 245 (e.g., and return the L2P table for the region to the first cache 235).

In some examples, the first cache 235 of the memory system 210 may include one or more static random-access memory (SRAM) cells for storing portions of a L2P table. As described herein, the L2P table may be stored to the non-volatile memory 245 but, due to size constraints, the entire L2P table may be unable to be stored to the first cache 235. Accordingly, portions of the L2P table corresponding to regions of the non-volatile memory 245 may be stored to the first cache 235.

For example, the first cache 235 may include a plurality of slots (e.g., a plurality of entries in the first cache 235) for storing portions of the L2P table that are associated with regions of the non-volatile memory 245. The portions of the L2P table stored to the slots may be organized based on a quantity of read operations performed on the associated region of the non-volatile memory 245. Such an organizational structure may be referred to as a "return-to-head" policy. Utilizing a return-to-head policy, the controller 230 may not have to track quantities of read operations on regions of the non-volatile memory 245 that would traditionally be tracked for HPB operations. Because tracked quantities of read operations may not be stored to the first cache 235, the first cache 235 may include additional storage (e.g., relative to a traditional HPB operation) for storing portions of the L2P table.

When a read command is received by the memory system 210, the controller 230 may determine whether a portion of the L2P table associated with a LBA of the read command is stored to a slot of the first cache 235. If the portion of the L2P table associated with the LBA of the read command is stored to a slot of the first cache 235, the controller 230 may perform a read operation on the non-volatile memory 245 using the portion of the L2P table stored to the slot of the first cache 235, and may subsequently promote the entry (e.g., the entry corresponding to the portion of the L2P table) to a first slot (e.g., to a first slot position) in the first cache 235. In some examples, if the portion of the L2P table associated with the LBA of the read command is not stored to a slot of the first cache 235, the controller 230 may load a mapping into the first cache 235 (e.g., from the L2P table stored in the non-volatile memory 245). As described herein, the mapping may be between the logical address associated with the region of the non-volatile memory 245 associated with the read request and a physical address.

Entries being stored to relatively high slots in the first cache 235 may represent regions of the non-volatile memory 245 that are more-frequently accessed. Conversely, entries being stored to relatively low slots in the first cache 235 may represent regions of the non-volatile memory 245 that are less-frequently accessed and may be subject to being removed from the first cache 235 when the first cache 235 is full. In some examples, the first cache 235 may be structured as a linked list. In some examples, the first cache 235 may make up a predetermined amount of cache memory at the memory system 210.

In some examples, the second cache 240 of the memory system 210 may store indices associated with regions of the non-volatile memory 245 and may be associated with entries removed from the first cache 235. As discussed herein, the first cache 235 may store portions of an L2P table and may organize the portions of the L2P table based on how frequently the associated region of the non-volatile memory 245 is accessed. When the first cache 235 becomes full, and when a subsequent read command is received by the memory system 210, the lowest entry (or lowest entries in the case of multiple read commands being received) may be removed from the first cache 235. When the entry is removed, an index associated with the region (e.g., an index to identify the region) may be stored to the second cache 240 and the corresponding portion of the L2P table (e.g., the portion of the L2P table previously stored to the first cache 235) may be transmitted to the host system 205.

The second cache 240 may include a plurality of slots (e.g., a plurality of entries in the second cache 240) for storing indices associated with regions of the non-volatile memory 245. The indices stored to the slots may be organized based on a quantity of read operations performed on the associated region of the non-volatile memory 245, and thus may indicate regions of the non-volatile memory 245 that are "active." For example, when an index associated with a region is stored to the second cache 240, at least one bit of the index may be set (e.g., to a high value; a "1") to indicate that the region is active. An active region may refer to a region of the non-volatile memory 245 that is relatively frequently accessed by the host system 305 (e.g., using a HPB operation). Conversely, regions that are less frequently accessed and/or include dirty data may be referred to as inactive regions, and at least one bit of the corresponding index may be set accordingly (e.g., to a low value; a "0"). In some examples, indices associated with inactive regions may be removed from the second cache 240.

The active regions having indices stored to the second cache 240 may represent regions that the host system 205 may perform a HPB operation on. For example, when a read command is received by the memory system 210, the controller 230 may determine whether an LBA of the read command is associated with a region having an index stored to the second cache 240. If an associated index is stored to the second cache 240, the controller 230 may perform a read operation on the non-volatile memory 245 using a portion of the L2P table provided by the host system 205 (e.g., stored to the cache 225). As described herein, the portion of the L2P table may have been transmitted to the host system 205 upon removing an entry from the first cache 235. In some examples, if an associated index is not stored to the second cache 240, the region may not be activated for HPB operations from host system 205.

When a read operation (e.g., a HPB read operation) is performed on a region of the non-volatile memory 245 having an index stored to the second cache 240, the controller 230 may promote the entry (e.g., the index stored to the second cache 240) to a first slot (e.g., to a first slot position using a "return-to-head" policy) in the second cache 240. Indices being stored to relatively high slots in the second cache 240 may represent regions of the non-volatile memory 245 that are more frequently accessed by the host system 205 (e.g., more frequently accessed using a HPB operation). Conversely, indices being stored to relatively low slots in the second cache 240 may represent regions of the non-volatile memory 245 that are less-frequently accessed and may be subject to being removed from the second cache 240 when the second cache 240 is full.

When the second cache 240 becomes full, or when data within a region becomes dirty, an index may be removed from the second cache 240. For example, when the second cache 240 becomes full and a read command is received by the memory system 210 that requires an entry to be removed from the first cache 235, the lowest entry may be removed from the first cache 235, the lowest index may be removed from the second cache 240, and an index associated with the entry removed from the first cache 235 may be stored to the second cache 240. At least one bit associated with the index may be set to a value indicating the region of the non-volatile memory 245 is active. Additionally or alternatively, when data within a region of the non-volatile memory 245 becomes dirty, at least one bit of the index corresponding to the dirty region may be set accordingly (e.g., to a low value; a "0") to indicate the region is inactive, and the index may be removed from the second cache 240.

In some examples, the memory system 210 may receive a read command from the host system 205 that is not associated with an entry stored to the first cache 235 or an index stored to the second cache 240. For example, the memory system 210 may have never received a read command associated with the associated region, or an index associated with the region may have been previously removed from the second cache 240. In such instances, the controller 230 may load a portion of the L2P table associated with the read command from the non-volatile memory 245. Upon loading the L2P table, the controller 230 may transmit data from the physical address of the non-volatile memory (e.g., as indicated by the mapping stored to the loaded L2P table) to the host system 205.

By performing read operations as described herein, latency associated with HPB operations may be reduced by loading some L2P tables directly from the first cache 235. Although an HPB operation may be performed relatively faster than a non-HPB operation, performance characteristics of the SRAM cells of the first cache 235 may allow for improved read speeds in non-HPB operations. Moreover, by organizing entries of the first cache 235 according to a frequency of read operations performed on the associated region, the first cache 235 may avoid tracking read counts for each region, thus reducing the quantity of storage needed for tracking operations.

Figure 3:
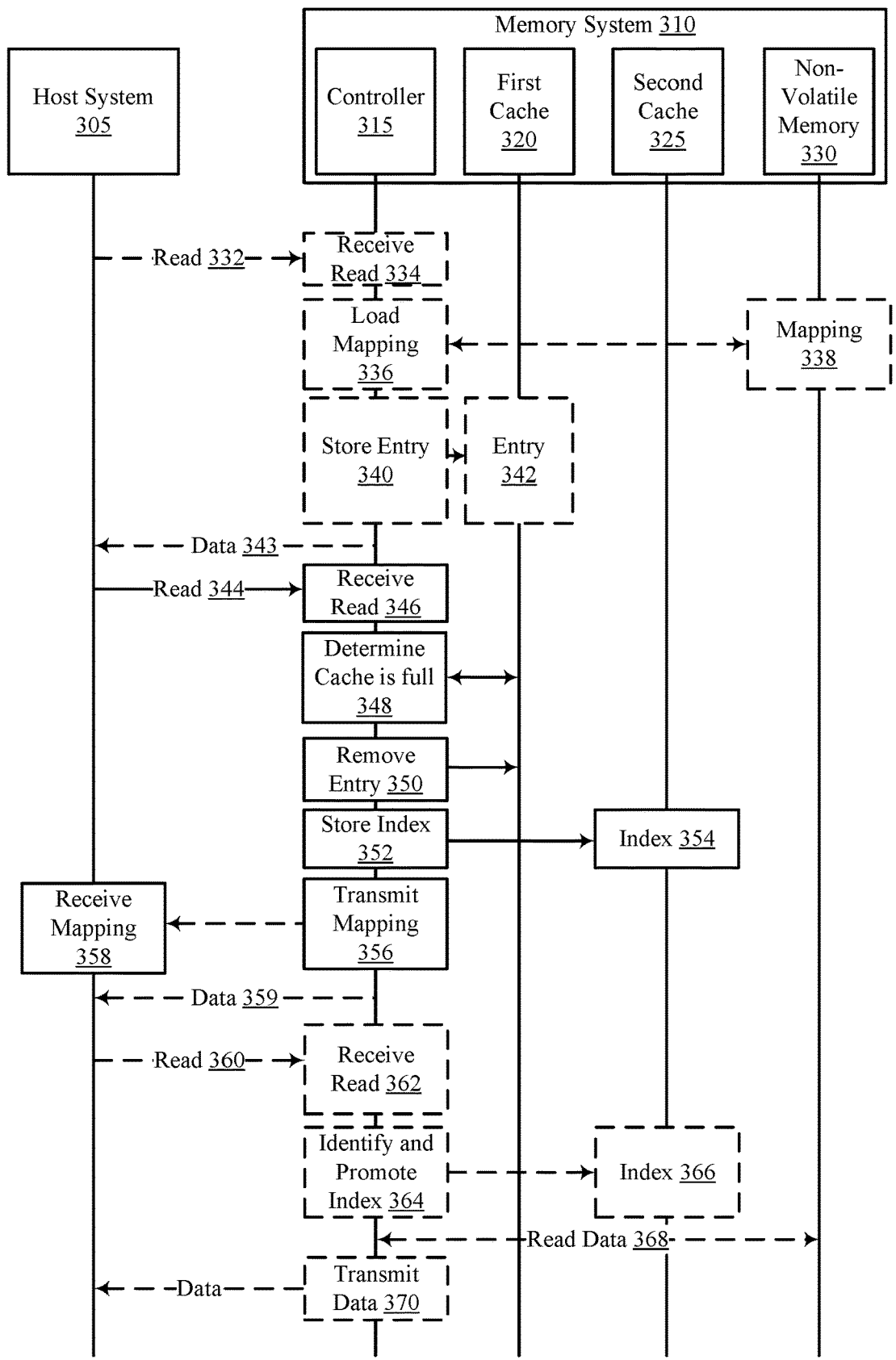
FIG. 3 illustrates an example of a process flow diagram that supports read operations for regions of a memory device in accordance with examples as disclosed herein.

FIG. 3 illustrates an example of a process flow diagram 300 that supports read operations for regions of a memory device in accordance with examples as disclosed herein. In some examples, the process flow diagram 300 may illustrate example operations of a host system 305 and memory system 310. The host system 305 may be an example of the host system 205 and the memory system 310 may be an example of the memory system 210 as described with reference to FIG. 2, respectively. In some examples, the memory system 310 may include a controller 315, a cache 320 (e.g., a first cache 320), a cache 325 (e.g., a second cache 325), and non-volatile memory 330, which may be examples of a controller 230, cache 235, cache 240, and non-volatile memory 245, respectively, as described with reference to FIG. 2. The first cache 320 and the second cache 325 may be partitions of a cache or buffer of the memory system 310, and may have predetermined (e.g., fixed) sizes, for example.

At 332, the host system 305 may optionally transmit a read command. The read command may include a LBA and may be for data associated with the non-volatile memory 330 of the memory system 310. At 334, the controller 315 of the memory system 310 may optionally receive the read command.

At 336, the controller 315 may optionally load a mapping 338 between the LBA included in the read command and a physical address of the non-volatile memory 330. The mapping 338 may be stored to the non-volatile memory 330 and may be a portion of a L2P table stored to the non-volatile memory. In some examples, the mapping 338 may be associated with a region of the non-volatile memory that includes the LBA included in the read command.

At 340, the controller 315 may optionally store an entry 342 to the cache 320 that includes the mapping 338. As described herein, the cache 320 may include a plurality of slots for storing entries (such as entry 342) that are associated with regions of the non-volatile memory 330. The entries may be organized using a "return-to-head" policy, where the entries are organized based on a recency of read operations performed on the associated region of the non-volatile memory 330. In some examples (not shown) the memory system 310 may receive a plurality of read commands and may subsequently load and store entries to the cache 320 until the cache 320 is full.

At 343, the controller 315 may optionally transmit data (e.g., data associated with the read command received at 332) to the host system 305. For example, the data may have been read from memory (e.g., non-volatile memory 330) based on the mapping 338 loaded from the non-volatile memory 330.

At 344, the host system 305 may transmit a read command (e.g., another read command). The read command may include a LBA and may be for data associated with the non-volatile memory 330 of the memory system 310. At 346, the controller 315 of the memory system 310 may receive the read command.

At 348, the controller 315 may determine whether the first cache 320 is full. Because the first cache 320 may include a finite quantity of slots (e.g., 256 slots), and the slots may be filled when the memory system 310 receives a read command associated with a respective region of the non-volatile memory 330, the first cache 320 may fill over time. In some examples, the first cache 320 may be full if, at a time a command is received, each slot (e.g., each of the 256 slots) is occupied. In other examples, the first cache 320 may be full based on a threshold value. For example, the first cache 320 may be full if, at a time a command is received, there is less than a threshold quantity of unoccupied slots. In yet another example, the first cache 320 may be full if, at a time a command is received, a lesser quantity of slots are available than associated with the command. For example, the first cache 320 may be full if a command that is requesting data requires three (3) slots, but only two (2) slots are unoccupied.

Accordingly, in response to determining that the first cache 320 is full and the memory system 310 receives a read command associated with a LBA that is not included in a mapping stored to the first cache 320, an entry may be removed from the first cache 320. In some examples, the controller 315 may determine that the first cache 320 is not full (e.g., the first cache 320 includes one or more available slots or sufficient available slots). In such examples, the slots may be filled when the memory system 310 receives a read command associated with a respective region of the non-volatile memory 330.

At 350, the controller 315 may remove an entry from the first cache 320. In some examples, data may be removed from the first cache 320 by erasing the data (e.g., by erasing an entry stored to the first cache 320). In other examples, data may be removed from the first cache by being identified (e.g., flagged) as data to be overwritten in a subsequent operation. As described herein, the first cache 320 may be organized using a "return-to-head" policy. Entries being stored to relatively high slots in the first cache 320 may represent regions of the non-volatile memory 330 that are more frequently or recently accessed. Conversely, entries being stored to relatively low slots in the cache 320 may represent regions of the non-volatile memory 330 that are less frequently or less recently accessed and may be subject to being removed when the cache 320 is full. Accordingly, at 350, the controller 315 may remove the last entry in the first cache 320, which may represent the least recently accessed region of the non-volatile memory 330 having a L2P mapping stored to the first cache 320.

At 352, the controller 315 may store an index 354 to the second cache 325. The index 354 may be associated with the entry removed from the first cache 320. The second cache 325 may include a plurality of slots (e.g., a plurality of entries in the second cache 240) for storing indices associated with regions of the non-volatile memory 330. The indices stored to the slots may be organized based on a quantity or recency of read operations performed on the associated region of the non-volatile memory 330, and thus may indicate regions of the non-volatile memory 330 that are "active." For example, when the index 354 is stored to the second cache 325, at least one bit of the index 354 may be set (e.g., to a high value; a "1") to indicate that the associated region of the non-volatile memory 330 is active (e.g., for HPB operation).

At 356, the controller 315 may transmit the mapping (e.g., L2P information) associated with the entry removed from the first cache 320 to the host system 305. At 358, the host system 305 may receive the mapping, which may be used for HPB operations. Accordingly, the host system 305 may use the mapping (e.g., a physical address of the non-volatile memory 330) when performing a subsequent read operation on the region. As described herein, the host system 305 may store and reference the mapping for subsequent HPB operations.

At 359, the controller 315 may optionally transmit data (e.g., data associated with the read command received at 344) to the host system 305. For example, the data may have been read from a memory (e.g., non-volatile memory 330) based on the mapping 356 loaded from the non-volatile memory 330 (and transmitted to the host system 305).

At 360, the host system 305 may optionally transmit a read command. The read command may be associated with a HPB operation and may include a physical address of the non-volatile memory 330. The physical address may have been included in the mapping transmitted to the host system 305 at 356. At 362, the controller 315 of the memory system 310 may optionally receive the read command.

At 364, the controller 315 may optionally identify and promote an index 366 stored to the second cache 325 that is associated with a region of the non-volatile memory 330 indicated in the read command. The index 366 may be promoted to a first position (e.g., a first slot) in the second cache 325, which may indicate that it is associated with a region having been most-recently accessed during a HPB operation. In some examples, the index 366 may include at least one bit that identifies the region as an active region. Due to the region being active, the controller 315 may identify the read command as a HPB read command (and thus may read data from the physical address indicated by the host system 305).

At 368, the controller 315 may optionally read data according to the physical address of the non-volatile memory 330 indicated by the read command. At 370, the controller 315 may optionally transmit the data to the host system 305.

In another example (not shown), the host system 305 may optionally transmit a read command and the controller 315 of the memory system 310 may optionally receive the read command. Upon receiving the read command, the controller 315 may optionally identify and promote an entry stored to the second cache 325 that is associated with a region of the non-volatile memory 330. The entry may include a portion of a L2P table that includes a mapping between a LBA indicated by the read command and a physical address of the non-volatile memory 330. The controller 315 may promote the entry to a first position (e.g., a first slot) in the second cache 325, which may indicate that it is associated with a region having been most-recently accessed. Additionally or alternatively, after promoting the entry, the controller 315 may read data according to the physical address of the non-volatile memory 330 indicated by the entry.

In yet another example (not shown), the host system 305 may optionally transmit a read command and the controller 315 of the memory system 310 may optionally receive the read command. Upon receiving the read command, the controller may optionally determine whether an entry associated with the read command is not stored to the cache 320, nor is an index associated with the read command stored to the cache 325. Accordingly, the controller 315 may load a portion of a L2P table stored to the non-volatile memory 330 and may access the non-volatile memory 330 using a mapping between a LBA and a physical address of the non-volatile memory 330. By performing read operations as described herein, latency associated with HPB operations may be reduced by loading some L2P tables directly from the cache 320. Although an HPB operation may be performed relatively faster than a non-HPB operation without LP2 information stored in first cache 320, performance characteristics of the first cache 320 may allow for improved read speeds in non-HPB operations if the L2P information is present in first cache 320 prior to the non-HPB operation.

Figure 4:
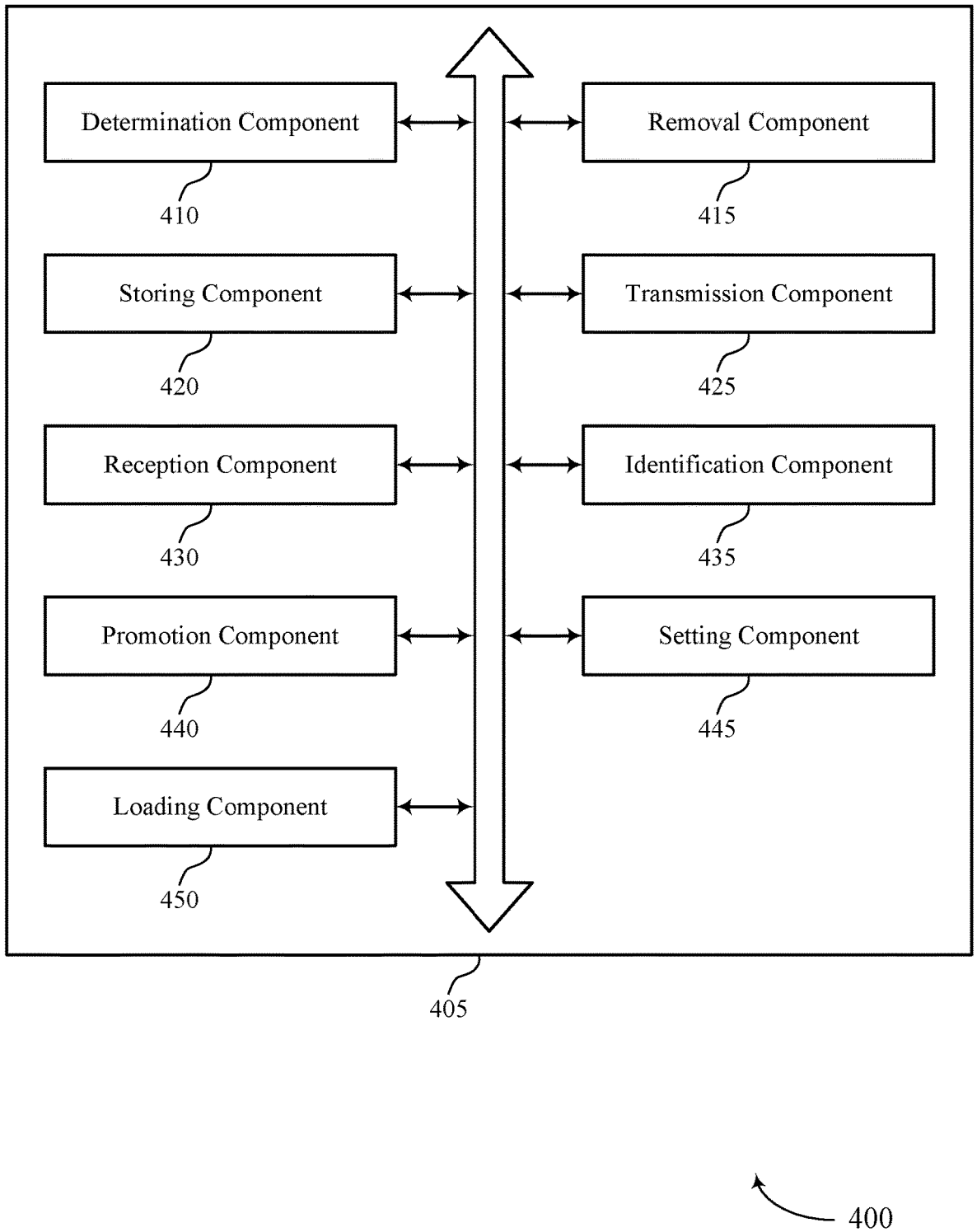
FIG. 4 shows a block diagram of a memory device that supports read operations for regions of a memory device in accordance with aspects of the present disclosure.

FIG. 4 shows a block diagram 400 of a memory device 405 that supports read operations for regions of a memory device in accordance with examples as disclosed herein. The memory device 405 may be an example of aspects of a memory device as described with reference to FIGS. 1 through 3. The memory device 405 may include a determination component 410, a removal component 415, a storing component 420, a transmission component 425, a reception component 430, an identification component 435, a promotion component 440, a setting component 445, and a loading component 450. Each of these modules may communicate, directly or indirectly, with one another (e.g., via one or more buses).

The determination component 410 may determine whether a first cache of a memory device is full based on receiving a read request for data from a block of a logical unit of the memory device, where the first cache of the memory device includes a set of entries that are each stored to a respective slot, and where each entry is configured to store a mapping between logical addresses and physical addresses for a respective region of the memory device. In some examples, the determination component 410 may determine whether an entry of the first cache of the memory device includes a mapping between the logical address included in the third read request and a physical address of the memory device.

In some examples, the determination component 410 may determine whether the second cache of the memory device is full based on removing the entry from the slot of the first cache. In some examples, the determination component 410 may determine whether the first cache of the memory device does not include an entry that includes a mapping between the logical address of the fifth read request and a physical address of the memory device.

The removal component 415 may remove an entry from a slot of the first cache based on determining that the first cache of the memory device is full. In some examples, the removal component 415 may remove a second index from the second cache of the memory device based on determining that the second cache of the memory device is full, where storing the index associated with the entry removed from the slot of the first cache is based on removing the second index. In some examples, the removal component 415 may remove the second index from the second cache of the memory device is based on the second index being in a last position in the table.

The storing component 420 may store, to a second cache of the memory device, an index associated with the entry removed from the slot of the first cache, where the index identifies a region of the memory device associated with the entry removed from the slot of the first cache.

The transmission component 425 may transmit, to a host device, a mapping between logical addresses and physical addresses of the region associated with the entry removed from the slot of the first cache based on storing the index to the second cache of the memory device. In some examples, the transmission component 425 may transmit, to the host device, data from the physical address of the memory device based on receiving the second read request.

In some examples, the transmission component 425 may transmit, to the host device, data from the physical address of the memory device based on determining that the entry of the first cache includes the mapping. In some examples, the transmission component 425 may transmit, to the host device, data from the physical address of the memory device based on loading the mapping. In some examples, the transmission component 425 may transmit, to the host device, data from the physical address of the memory device based on loading the mapping.

The reception component 430 may receive, from the host device, a second read request for data of the memory device after transmitting the mapping to the host device, where the second read request includes a physical address of the region of the memory device. In some examples the reception component 430 may receive, from the host device, a third read request for data of the memory device after transmitting the mapping to the host device, where the third read request includes a logical address associated with a region of the memory device.

In some examples the reception component 430 may receive, from the host device, a fourth read request for data of the memory device after setting the value of the at least one bit of the second index to the second value, where the fourth read request includes a logical address associated with the region of the memory device associated with the second index. In some examples the reception component 430 may receive, from the host device, a fifth read request for data of the memory device after transmitting the mapping to the host device, where the fifth read request includes a logical address associated with a region of the memory device.

The identification component 435 may identify the index associated with the region that includes the physical address included in the second read request.

The promotion component 440 may promote the index to a first position in the table including the set of indices. In some examples, the promotion component 440 may promote, to a first slot of the first cache, the entry of the first cache that includes the mapping between the logical address included in the third read request and the physical address of the memory device based on determining that the entry of the first cache includes the mapping.

The setting component 445 may set a value of at least one bit of the index to a first value, where the first value indicates that the region of the memory device associated with the index is active. In some examples, the setting component 445 may set a value of at least one bit of a second index stored to the second cache of the memory device to a second value, where the second value indicates that the region of the memory device associated with the second index is inactive.

The loading component 450 may load, from the memory device, a mapping between the logical address associated with the region of the memory device associated with the second index and a physical address. In some examples, the loading component 450 may load into the first cache, from a portion of a storage area of the memory device, a mapping between the logical address associated with the region of the memory device associated with the fifth read request and a physical address.

Figure 5:
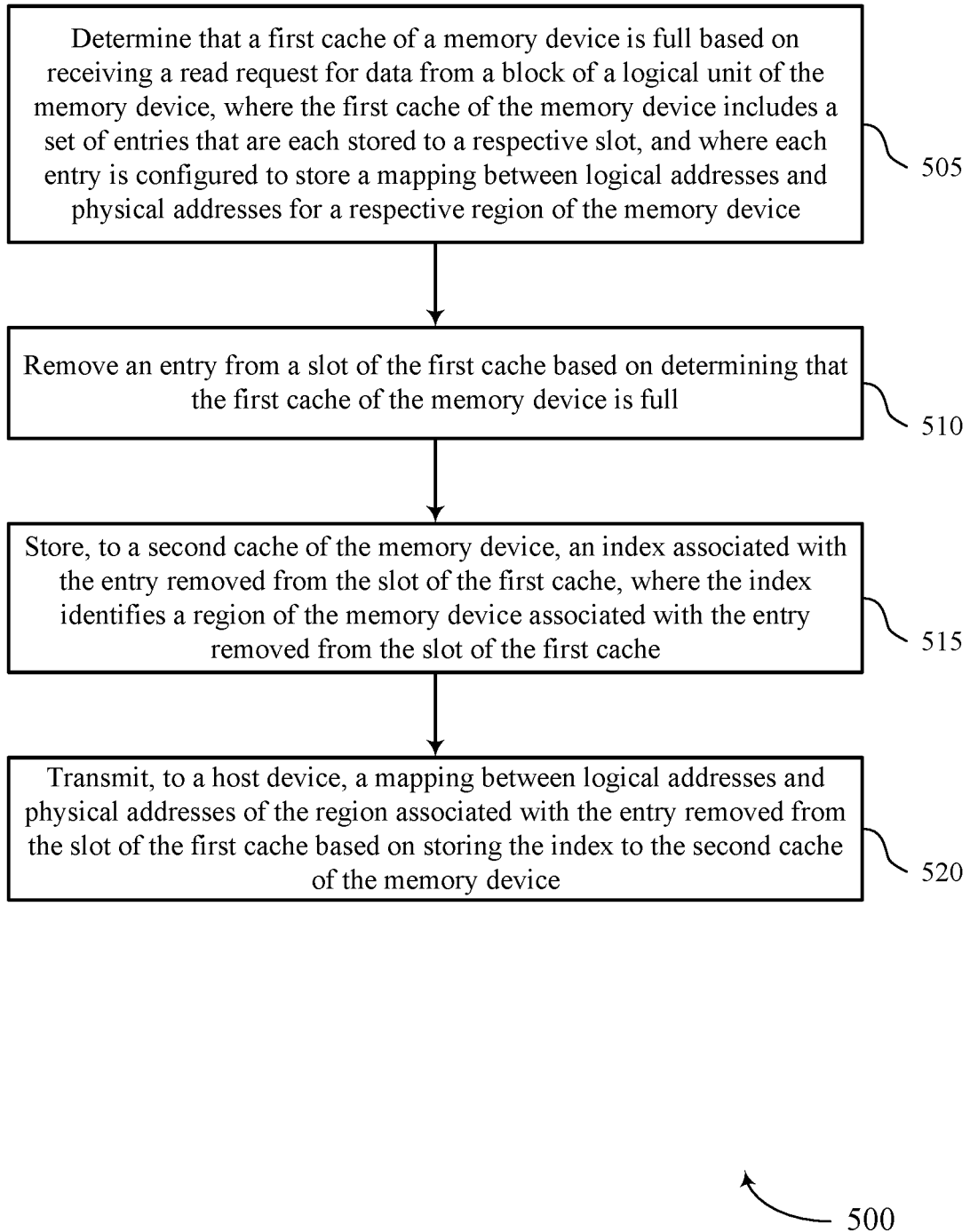
FIG. 5 shows a flowchart illustrating a method or methods that support read operations for regions of a memory device in accordance with examples as disclosed herein.

FIG. 5 shows a flowchart illustrating a method or methods 500 that supports read operations for regions of a memory device in accordance with aspects of the present disclosure. The operations of method 500 may be implemented by a memory device or its components as described herein. For example, the operations of method 500 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 505, the memory device may determine whether a first cache of a memory device is full based on receiving a read request for data from a block of a logical unit of the memory device, where the first cache of the memory device includes a set of entries that are each stored to a respective slot, and where each entry is configured to store a mapping between logical addresses and physical addresses for a respective region of the memory device. The operations of 505 may be performed according to the methods described herein. In some examples, aspects of the operations of 505 may be performed by a determination component as described with reference to FIG. 4.

At 510, the memory device may remove an entry from a slot of the first cache based on determining that the first cache of the memory device is full. The operations of 510 may be performed according to the methods described herein. In some examples, aspects of the operations of 510 may be performed by a removal component as described with reference to FIG. 4.

At 515, the memory device may store, to a second cache of the memory device, an index associated with the entry removed from the slot of the first cache, where the index identifies a region of the memory device associated with the entry removed from the slot of the first cache. The operations of 515 may be performed according to the methods described herein. In some examples, aspects of the operations of 515 may be performed by a storing component as described with reference to FIG. 4.

At 520, the memory device may transmit, to a host device, a mapping between logical addresses and physical addresses of the region associated with the entry removed from the slot of the first cache based on storing the index to the second cache of the memory device. The operations of 520 may be performed according to the methods described herein. In some examples, aspects of the operations of 520 may be performed by a transmission component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for determining that a first cache of a memory device is full based on receiving a read request for data from a block of a logical unit of the memory device, where the first cache of the memory device includes a set of entries that are each stored to a respective slot, and where each entry is configured to store a mapping between logical addresses and physical addresses for a respective region of the memory device, removing an entry from a slot of the first cache based on determining that the first cache of the memory device is full, storing, to a second cache of the memory device, an index associated with the entry removed from the slot of the first cache, where the index identifies a region of the memory device associated with the entry removed from the slot of the first cache, and transmitting, to a host device, a mapping between logical addresses and physical addresses of the region associated with the entry removed from the slot of the first cache based on storing the index to the second cache of the memory device.

Some examples of the method 500 and the apparatus described herein may further include operations, features, means, or instructions for receiving, from the host device, a second read request for data of the memory device after transmitting the mapping to the host device, where the second read request includes a physical address of the region of the memory device, and transmitting, to the host device, data from the physical address of the memory device based on receiving the second read request.

In some examples of the method 500 and the apparatus described herein, the second cache of the memory device may include operations, features, means, or instructions for identifying the index associated with the region that includes the physical address included in the second read request, and promoting the index to a first position in the table including the set of indices.

Some examples of the method 500 and the apparatus described herein may further include operations, features, means, or instructions for receiving, from the host device, a third read request for data of the memory device after transmitting the mapping to the host device, where the third read request includes a logical address associated with a region of the memory device, determining that an entry of the first cache of the memory device includes a mapping between the logical address included in the third read request and a physical address of the memory device, and transmitting, to the host device, data from the physical address of the memory device based on determining that the entry of the first cache includes the mapping.

Some examples of the method 500 and the apparatus described herein may further include operations, features, means, or instructions for promoting, to a first slot of the first cache, the entry of the first cache that includes the mapping between the logical address included in the third read request and the physical address of the memory device based on determining that the entry of the first cache includes the mapping.

In some examples of the method 500 and the apparatus described herein, storing the index to the second cache of the memory device may include operations, features, means, or instructions for setting a value of at least one bit of the index to a first value, where the first value indicates that the region of the memory device associated with the index may be active.

Some examples of the method 500 and the apparatus described herein may further include operations, features, means, or instructions for setting a value of at least one bit of a second index stored to the second cache of the memory device to a second value, where the second value indicates that the region of the memory device associated with the second index may be inactive.

Some examples of the method 500 and the apparatus described herein may further include operations, features, means, or instructions for receiving, from the host device, a fourth read request for data of the memory device after setting the value of the at least one bit of the second index to the second value, where the fourth read request includes a logical address associated with the region of the memory device associated with the second index, loading, from the memory device, a mapping between the logical address associated with the region of the memory device associated with the second index and a physical address, and transmitting, to the host device, data from the physical address of the memory device based on loading the mapping.

Some examples of the method 500 and the apparatus described herein may further include operations, features, means, or instructions for determining that the second cache of the memory device may be full based on removing the entry from the slot of the first cache, and removing a second index from the second cache of the memory device based on determining that the second cache of the memory device may be full, where storing the index associated with the entry removed from the slot of the first cache may be based on removing the second index.

In some examples of the method 500 and the apparatus described herein, the second cache of the memory device includes a table including a set of indices that identify regions of the memory device associated with entries removed from respective slots of the first cache, and removing the second index from the second cache of the memory device may be based on the second index being in a last position in the table.

Some examples of the method 500 and the apparatus described herein may further include operations, features, means, or instructions for receiving, from the host device, a fifth read request for data of the memory device after transmitting the mapping to the host device, where the fifth read request includes a logical address associated with a region of the memory device, determining that the first cache of the memory device does not include an entry that includes a mapping between the logical address of the fifth read request and a physical address of the memory device, loading into the first cache, from a portion of a storage area of the memory device, a mapping between the logical address associated with the region of the memory device associated with the fifth read request and a physical address, and transmitting, to the host device, data from the physical address of the memory device based on loading the mapping.

In some examples of the method 500 and the apparatus described herein, the entry removed from the slot of the first cache may be located in a last position of a table that includes the set of entries.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory system including memory configured as a first cache, a controller coupled with the memory system, where the controller is configured to, remove an entry from a slot of the first cache based on determining that the first cache is full, store, to a second cache of the memory system, an index associated with the entry removed from the slot of the first cache, where the index identifies a region of the memory system associated with the entry removed from the slot of the first cache, and transmit, to a host device, a mapping between logical addresses and physical addresses of the region associated with the entry removed from the slot of the first cache based on storing the index to the second cache of the memory system.

Some examples may further include receiving, from the host device, a second read request for data of the memory system after transmitting the mapping to the host device, where the second read request includes a physical address of the region of the memory system, and transmit, to the host device, data from the physical address of the memory system based on receiving the second read request.

In some examples, the second cache of the memory system may include operations, features, means, or instructions for identify the index associated with the region that includes the physical address included in the second read request, and promote the index to a first position in the table including the set of indices.

Some examples may further include receiving, from the host device, a third read request for data of the memory system after transmitting the mapping to the host device, where the third read request includes a logical address associated with a region of the memory system, determine whether an entry of the first cache of the memory system includes a mapping between the logical address included in the third read request and a physical address of the memory system, and transmit, to the host device, data from the physical address of the memory system based on determining that the entry of the first cache includes the mapping.

Some examples may further include promoting, to a first slot of the first cache, the entry of the first cache that includes the mapping between the logical address included in the third read request and the physical address of the memory system based on determining that the entry of the first cache includes the mapping.

Some examples may further include setting a value of at least one bit of a second index stored to the second cache of the memory system to a second value, where the second value indicates that the region of the memory system associated with the second index may be inactive.

Some examples may further include receiving, from the host device, a fourth read request for data of the memory system after setting the value of the at least one bit of the second index to the second value, where the fourth read request includes a logical address associated with the region of the memory system associated with the second index, load, from the memory system, a mapping between the logical address associated with the region of the memory system associated with the second index and a physical address, and transmit, to the host device, data from the physical address of the memory system based on loading the mapping.

Some examples may further include determining that the second cache of the memory system may be full based on removing the entry from the slot of the first cache, and remove a second index from the second cache of the memory system based on determining that the second cache of the memory system may be full, where storing the index associated with the entry removed from the slot of the first cache may be based on removing the second index.

Some examples may further include receiving, from the host device, a fifth read request for data of the memory system after transmitting the mapping to the host device, where the fifth read request includes a logical address associated with a region of the memory system, determine whether the first cache of the memory system does not include an entry that includes a mapping between the logical address of the fifth read request and a physical address of the memory system, load into the first cache, from a portion of a storage area of the memory system, a mapping between the logical address associated with the region of the memory system associated with the fifth read request and a physical address, and transmit, to the host device, data from the physical address of the memory system based on loading the mapping.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

If used to describe a conditional action or process, the terms "if," "when," "based on," "based at least in part on," and "in response to," may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A non-transitory computer-readable medium storing code, the code comprising instructions executable by a processor to:
   determine whether a first cache of a memory device is full based at least in part on receiving a read request for data from a block of a logical unit of the memory device, wherein the first cache of the memory device comprises a plurality of entries that are each stored to a respective slot, and wherein each entry is configured to store a mapping between logical addresses and physical addresses for a respective region of the memory device;
   remove an entry from a slot of the first cache based at least in part on determining that the first cache of the memory device is full;
   store, to a second cache of the memory device, an index associated with the entry removed from the slot of the first cache, wherein the index identifies a region of the memory device associated with the entry removed from the slot of the first cache; and
   transmit, to a host device, a mapping between logical addresses and physical addresses of the region associated with the entry removed from the slot of the first cache based at least in part on storing the index to the second cache of the memory device.

2. The non-transitory computer-readable medium of claim 1, wherein the instructions are further executable by the processor to:
   receive, from the host device, a second read request for data of the memory device after transmitting the mapping to the host device, wherein the second read request comprises a physical address of the region of the memory device; and
   transmit, to the host device, data from the physical address of the memory device based at least in part on receiving the second read request.

3. The non-transitory computer-readable medium of claim 2, wherein the second cache of the memory device comprises a table including a plurality of indices that identify regions of the memory device associated with entries removed from respective slots of the first cache, and wherein the instructions are further executable by the processor to:
   identify the index associated with the region that includes the physical address included in the second read request; and
   promote the index to a first position in the table including the plurality of indices.

4. The non-transitory computer-readable medium of claim 1, wherein the instructions are further executable by the processor to:
   receive, from the host device, a third read request for data of the memory device after transmitting the mapping to the host device, wherein the third read request comprises a logical address associated with a region of the memory device;
   determine whether an entry of the first cache of the memory device includes a mapping between the logical address included in the third read request and a physical address of the memory device; and
   transmit, to the host device, data from the physical address of the memory device based at least in part on determining that the entry of the first cache includes the mapping.

5. The non-transitory computer-readable medium of claim 4, wherein the instructions are further executable by the processor to:
   promote, to a first slot of the first cache, the entry of the first cache that includes the mapping between the logical address included in the third read request and the physical address of the memory device based at least in part on determining that the entry of the first cache includes the mapping.

6. The non-transitory computer-readable medium of claim 1, wherein the instructions are further executable by the processor to store the index to the second cache of the memory device by:
   setting a value of at least one bit of the index to a first value, wherein the first value indicates that the region of the memory device associated with the index is active.

7. The non-transitory computer-readable medium of claim 1, wherein the instructions are further executable by the processor to:
   set a value of at least one bit of a second index stored to the second cache of the memory device to a second value, wherein the second value indicates that the region of the memory device associated with the second index is inactive.

8. The non-transitory computer-readable medium of claim 7, wherein the instructions are further executable by the processor to:
   receive, from the host device, a fourth read request for data of the memory device after setting the value of the at least one bit of the second index to the second value, wherein the fourth read request comprises a logical address associated with the region of the memory device associated with the second index;
   load, from the memory device, a mapping between the logical address associated with the region of the memory device associated with the second index and a physical address; and
   transmit, to the host device, data from the physical address of the memory device based at least in part on loading the mapping.

9. The non-transitory computer-readable medium of claim 1, wherein the instructions are further executable by the processor to:
  determine whether the second cache of the memory device is full based at least in part on removing the entry from the slot of the first cache; and
  remove a second index from the second cache of the memory device based at least in part on determining that the second cache of the memory device is full, wherein storing the index associated with the entry removed from the slot of the first cache is based at least in part on removing the second index.

10. The non-transitory computer-readable medium of claim 9, wherein:
  the second cache of the memory device comprises a table including a plurality of indices that identify regions of the memory device associated with entries removed from respective slots of the first cache; and
  removing the second index from the second cache of the memory device is based at least in part on the second index being in a last position in the table.

11. The non-transitory computer-readable medium of claim 1, wherein the instructions are further executable by the processor to:
  receive, from the host device, a fifth read request for data of the memory device after transmitting the mapping to the host device, wherein the fifth read request comprises a logical address associated with a region of the memory device;
  determine whether the first cache of the memory device does not include an entry that includes a mapping between the logical address of the fifth read request and a physical address of the memory device;
  load into the first cache, from a portion of a storage area of the memory device, a mapping between the logical address associated with the region of the memory device associated with the fifth read request and a physical address; and
  transmit, to the host device, data from the physical address of the memory device based at least in part on loading the mapping.

12. The non-transitory computer-readable medium of claim 1, wherein the entry removed from the slot of the first cache is located in a last position of a table that comprises the plurality of entries.

13. An apparatus, comprising:
  a memory system comprising memory configured as a first cache; and
  a controller coupled with the memory system, wherein the controller is configured to:
    determine whether the first cache is full based at least in part on receiving a read request for data from a block of a logical unit of the memory system, wherein the first cache comprises a plurality of entries that are each stored to a respective slot of the first cache, and wherein each entry is configured to store a mapping between logical addresses and physical addresses for a respective region of the memory system;
    remove an entry from a slot of the first cache based at least in part on determining that the first cache is full;
    store, to a second cache of the memory system, an index associated with the entry removed from the slot of the first cache, wherein the index identifies a region of the memory system associated with the entry removed from the slot of the first cache; and
    transmit, to a host device, a mapping between logical addresses and physical addresses of the region associated with the entry removed from the slot of the first cache based at least in part on storing the index to the second cache of the memory system.

14. The apparatus of claim 13, wherein the controller is configured to:
  receive, from the host device, a second read request for data of the memory system after transmitting the mapping to the host device, wherein the second read request comprises a physical address of the region of the memory system; and
  transmit, to the host device, data from the physical address of the memory system based at least in part on receiving the second read request.

15. The apparatus of claim 14, wherein the second cache of the memory system comprises a table including a plurality of indices that identify regions of the memory system associated with entries removed from respective slots of the first cache, wherein the controller is configured to:
  identify the index associated with the region that includes the physical address included in the second read request; and
  promote the index to a first position in the table including the plurality of indices.

16. The apparatus of claim 13, wherein the controller is configured to:
  receive, from the host device, a third read request for data of the memory system after transmitting the mapping to the host device, wherein the third read request comprises a logical address associated with a region of the memory system;
  determine whether an entry of the first cache of the memory system includes a mapping between the logical address included in the third read request and a physical address of the memory system; and
  transmit, to the host device, data from the physical address of the memory system based at least in part on determining that the entry of the first cache includes the mapping.

17. The apparatus of claim 16, wherein the controller is configured to:
  promote, to a first slot of the first cache, the entry of the first cache that includes the mapping between the logical address included in the third read request and the physical address of the memory system based at least in part on determining that the entry of the first cache includes the mapping.

18. The apparatus of claim 13, wherein the controller is configured to:
  set a value of at least one bit of a second index stored to the second cache of the memory system to a second value, wherein the second value indicates that the region of the memory system associated with the second index is inactive.

19. The apparatus of claim 18, wherein the controller is configured to:
  receive, from the host device, a fourth read request for data of the memory system after setting the value of the at least one bit of the second index to the second value, wherein the fourth read request comprises a logical address associated with the region of the memory system associated with the second index;
  load, from the memory system, a mapping between the logical address associated with the region of the memory system associated with the second index and a physical address; and transmit, to the host device, data from the physical address of the memory system based at least in part on loading the mapping.

20. The apparatus of claim 13, wherein the controller is configured to:
   determine whether the second cache of the memory system is full based at least in part on removing the entry from the slot of the first cache; and
   remove a second index from the second cache of the memory system based at least in part on determining that the second cache of the memory system is full, wherein storing the index associated with the entry removed from the slot of the first cache is based at least in part on removing the second index.

21. The apparatus of claim 13, wherein the controller is configured to:
   receive, from the host device, a fifth read request for data of the memory system after transmitting the mapping to the host device, wherein the fifth read request comprises a logical address associated with a region of the memory system;
   determine whether the first cache of the memory system does not include an entry that includes a mapping between the logical address of the fifth read request and a physical address of the memory system;
   load into the first cache, from a portion of a storage area of the memory system, a mapping between the logical address associated with the region of the memory system associated with the fifth read request and a physical address; and
   transmit, to the host device, data from the physical address of the memory system based at least in part on loading the mapping.

22. A system, comprising:
   a memory device comprising memory configured as a first cache for storing entries that include respective mappings between logical addresses and physical addresses for regions of the memory device, and comprising a second cache for storing indices that identify regions of the memory device associated with entries removed from the first cache; and
   a host device coupled with the memory device and configured to store mappings between logical addresses and physical addresses of the regions associated with the indices stored to the second cache of the memory device.

23. The system of claim 22, wherein the memory device is configured to:
   remove entries from the first cache based at least in part on determining that the first cache of the memory device is full;
   store indices that identify regions of the memory device associated with the entries removed from the first cache to the second cache of the memory device; and
   transmit mappings between logical addresses and physical addresses of the regions associated with the entries removed from the first cache to the host device.

24. The system of claim 23, wherein the second cache of the memory device comprises a table including a plurality of indices that identify regions of the memory device associated with entries removed from respective slots of the first cache.

25. The system of claim 23, wherein:
   the host device is configured to transmit read requests for data that comprise a physical address of a region of the memory device to the host device after receiving the mappings; and
   the memory device is configured to transmit data from the physical address of the memory device in response to receiving the respective read requests.

* * * * *